W. A. SCHMIDT.
PROCESS FOR CLASSIFYING FINELY DIVIDED MATERIAL.
APPLICATION FILED AUG. 28, 1916.
1,335,758.
Patented Apr. 6, 1920.
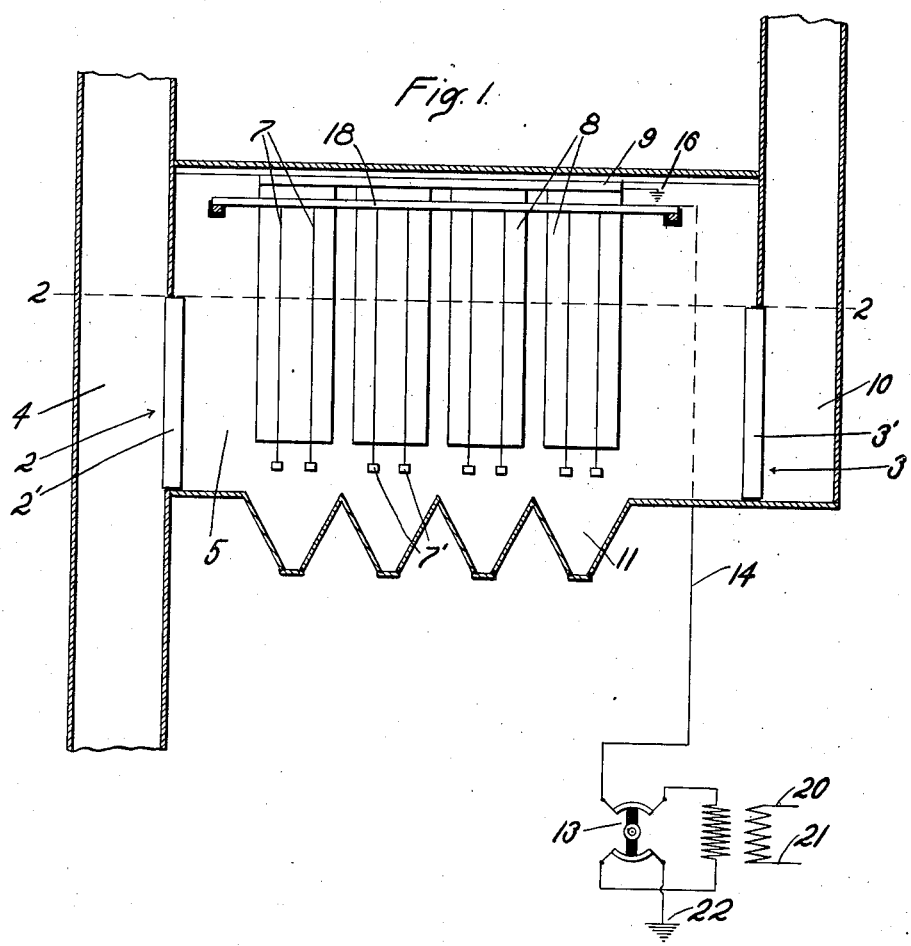
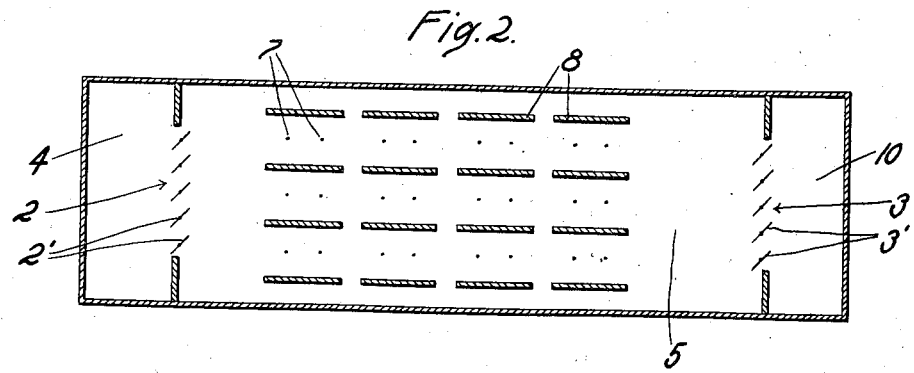
Inventor:
Walter A. Schmidt
by Arthur P. Knight
his Attorney.

UNITED STATES PATENT OFFICE.

WALTER A. SCHMIDT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS FOR CLASSIFYING FINELY-DIVIDED MATERIAL.

1,335,758.  Specification of Letters Patent.  Patented Apr. 6, 1920.

Original application filed February 18, 1915, Serial No. 9,066. Divided and this application filed August 28, 1916. Serial No. 117,183.

*To all whom it may concern:*

Be it known that I, WALTER A. SCHMIDT, a citizen of the United States, residing at Los Angeles, in the county of Los Angeles and State of California, have invented a new and useful Process for Classifying Finely-Divided Material, of which the following is a specification.

This invention relates to the separation of finely divided materials into classes or parts according to size or equivalent property, and particularly to the separation into different parts of suspended material carried by flue or furnace gases or otherwise occurring in the arts.

The main object of the invention is to provide for separation or classification of the material in such manner as to reduce to a minimum the expense of installing and operating the apparatus for carrying out such operation. A further object of the invention is to provide for carrying out such separation in the case of particles too fine to be successfully separated or collected by the ordinary processes depending on gravitative settling, centrifugal action or the like.

This application is a division of my application, Ser. No. 9066, filed February 18, 1915, now Patent No. 1,200,887, granted Oct. 10, 1916, for process of obtaining alkali metal compound.

The accompanying drawings illustrate an apparatus suitable for carrying out my invention, and referring thereto:

Figure 1 is a vertical section of the apparatus.

Fig. 2 is a horizontal section on line 2—2 in Fig. 1.

In the drawings, 4 designates a flue, stack or other means for conducting a stream or current of gas, containing suspended material of different degrees of fineness. Said stack may, for example, as specified in my said application, be the stack of a cement burning kiln. It may, however, be the outlet flue of any furnace or other apparatus in which fumes or dust are produced, provided such fumes or dust contain particles of different size so as to be susceptible to the operation of this process.

This flue is connected to the inlet opening 2 of a casing or chamber 5, said chamber being preferably of considerable length, and having the inlet opening 2 at one end and an outlet opening 3, at its other end, communicating with a stack or outlet flue 10. Dampers 2' and 3' are preferably provided at the respective openings 2 and 3, to control the rate of flow through the chamber 5, said dampers being operated by any suitable means, not shown.

Suspended in the chamber 5 are a series of rows of vertical plates 8 constituting collecting electrodes, and a series of rows of discharge electrodes 7, formed, for example, as wires hung between the plates of each row. The collecting electrodes 8 may be hung from a top frame 9, which is grounded as indicated at 16. The discharge electrodes are hung from an insulated frame 18 which may be connected by wire 14 to suitable means for supplying high tension current, preferably unidirectional. For this purpose, wire 14 may be connected to a rectifier 13 of any suitable type which is connected to the secondary winding of a step-up transformer, the primary winding thereof being connected to an alternating current supply circuit 20—21. Rectifier 13 is provided with ground connection 22, for completing circuit to the grounded parts 8 of the precipitating apparatus. Discharge electrodes 7 may be held in position by weights 7' or otherwise.

Each row of plates 8, with the intervening discharge electrodes 7, constitutes a precipitating element or portion arranged transversely of the current of gas passing through chamber 5 and adapted to subject such gas to electrical action, so that the gas in passing successively through the successive elements will be subjected to a succession of precipitating actions. Collecting or receiving means such as hoppers or bins 11, are provided below the respective precipitating elements aforesaid to receive the material precipitated thereby, said bins being provided with any suitable means for withdrawing material therefrom, either continuously or from time to time.

My process may be carried out as follows, in the above described apparatus:

The gas containing finely divided suspended matter of different degrees of fineness, is drawn or forced through the chamber 5, either by natural draft or by forced draft, and in passing between the successive rows of collecting and discharge electrodes 8 and 7, is subjected to the action of electric field produced between such electrodes, with the result that the particles suspended in the gas become electrically charged and are caused to move toward the plates 8, by the action of the electrical field portions or elements; being deposited on or against said plates and eventually caused to drop to the bottom of the chamber 5, and into the receptacles or bins 11, the deposits on the collecting electrodes being dislodged therefrom from time to time, if necessary, by any suitable means to cause them to drop into said bins. I have found that in this operation, the larger particles are most readily and quickly precipitated so that the deposit in the first bins is mostly or largely of comparatively large particles, and that the finer particles are more slowly precipitated, so that the material accumulated in successive bins in the series is progressively finer or consists of particles smaller in size. In explanation of this selective action, it may be stated that the larger particles can be more readily charged to the degree necessary for effective action of the electrostatic field, while at the same time, the smaller particles offer relatively a greater resistance to translation through the gaseous medium, due to the higher relative buoyancy.

The above described process, therefore, provides for selective separation of the particles suspended in the gas, with respect to size, and by properly constructing the apparatus as to length and cross-sectional area of the chamber 5, the number of precipitating elements and receiving bins so as to properly proportion the rate of travel to the rapidity of precipitation of the particles by the electrical action, any desired separation or classification of such material as to size may be provided for.

The cross-sectional area of the chamber 5 is substantially the same throughout its length so that the rate of flow or velocity of the gas is substantially uniform throughout the travel thereof in said chamber and the gas passes with such rapidity through the series of field portions or sections that substantially the same conditions as to temperature exist throughout the body of gas, the difference in precipitating action as to successive selective precipitation of progressively finer particles resulting from the time of exposure to electro-precipitating action rather than to difference of temperature. My process is also distinguished from processes involving the use of a precipitating chamber of progressively increasing cross-sectional area so as to produce progressive retardation of the gas with resultant selective precipitation of the progressively finer materials, the velocity of gas flow being substantially uniform, as above stated, so that the selective precipitation is due to the time element, as above explained.

The process described is applicable also for separation of ore constituents passing off as dust and fume from smelters, or the like, and in such cases, as well as in the case of cement dust, the selective separation as to size may result also in selective separation as to chemical constitution of the particles.

While my invention is particularly intended for selective precipitation of suspended material present in the effluent gases of furnaces or kilns, it is capable of other applications, for example—the material to be classified may be taken from a body of such material, such as a pile or body of finely divided silica, ore or other rock, and distributed into a stream of air or other gas, by blowing or injecting it into such gas, and the gas containing the suspended particles of different degrees of fineness may then be passed through the series of precipitating elements as above described so as to successively precipitate the constituents of progressively finer or smaller size.

An important feature of my process as above described is that the progressive and selective separation of the particles of different fineness is accomplished by the action of successive electrical field portions of substantially similar intensity so that no special differentiation of the field producing elements as regards the field intensity thereof is necessary, the separation being effected primarily by reason of the greater time that is required for precipitation of the finer particles. It will be understood that the selection or separation by this process is not necessarily sharp, as more or less of the finer material may be precipitated along with the coarser material. Thus, in applying the invention in connection with cement dust, as described in my application aforesaid, more or less fine particles, consisting largely of potassium compounds, may be precipitated along with the coarser particles in the first precipitating elements of the series; but the separation so effected is sufficient for many purposes, and in any case wherein it is not sufficient, a closer separation may be effected by passing the precipitated material from any one or more of the bins 11, back to the supply flue 4, and acting on it a second time in the same apparatus, or in another apparatus.

As described in my prior application aforesaid, my process may be advantageously employed in selectively separating potassium compound to a greater or less degree, from the other materials present in the dust passing from cement kilns. The present invention, when so applied, constituting a step in the complete process of volatilization, condensation and selective precipitation disclosed and claimed in said application. The invention is, however, applicable to selective separation of particles of different fineness, irrespective of the manner in which they are introduced into the gas and irrespective of the chemical composition thereof, provided only that the particles are differentiated, or are of different classes, as to size or otherwise, so that the time required for precipitation differs for different classes of the particles. Thus, the particles or finely divided material may be brought into a condition of suspension in the gas by the action of the heat, as above described; or by mechanical action, as by blowing or injecting the finely divided material into the gas precedent to the precipitation action.

What I claim is:

1. The process of selectively separating particles of different size suspended in a gas, which consists in passing the gas successively, at substantially uniform velocity through a series of electric fields of substantially similar intensity and substantially uniform cross-sectional area to produce a succession of electrical actions on the gas in such manner as to precipitate successively particles of progressively smaller size and collecting separately the different sizes of precipitated particles.

2. The process of selectively separating, as to size, particles suspended in a gas, which consists in passing the gas in a stream of substantially uniform cross-sectional area and substantially uniform velocity through a series of electrical fields, all presenting substantially the same electrostatic conditions, in such manner as to cause precipitation of particles of different fineness mainly in different field portions and collecting separately the different sizes of precipitated particles.

3. The process of selectively separating as to size particles suspended in a gas, which consists in passing the gas between successive electric-field portions of substantially uniform cross-sectional area presenting sufficiently high potential difference to cause precipitation of the particles from the gas, the travel of the particles between the electrodes during the time of precipitation being sufficient to cause the smaller particles to be precipitated separately from and subsequent to the larger particles and collecting separately the different sizes of precipitated particles.

4. The process of selectively separating particles of different size suspended in a gas, which consists in successively passing the gas between successive electrical field portions, the rate of flow of the gas being substantially uniform throughout the operation and being so proportionate relative to the rapidity of electrical precipitation by the successive field portions, that the finer and more difficultly precipitable particles are carried beyond the place of precipitation of the coarser particles and are precipitated separately therefrom and collecting separately the different sizes of precipitated particles.

In testimony whereof I have hereunto set my hand, at Los Angeles, California, this 18th day of August, 1916.

WALTER A. SCHMIDT.